United States Patent
Seo et al.

(10) Patent No.: US 12,443,859 B2
(45) Date of Patent: Oct. 14, 2025

(54) DIALOGUE MODEL TRAINING METHOD AND DEVICE THEREFOR

(71) Applicant: Hyperconnect LLC, Seoul (KR)

(72) Inventors: Seok Jun Seo, Seoul (KR); Seung Ju Han, Seoul (KR); Beom Su Kim, Seoul (KR); Bu Ru Chang, Seoul (KR); Enkhbayar Erdenee, Seoul (KR)

(73) Assignee: Hyperconnect LLC, Dallas, TX (US)

( * ) Notice: Subject to any disclaimer, the term of this patent is extended or adjusted under 35 U.S.C. 154(b) by 517 days.

(21) Appl. No.: 17/807,653

(22) Filed: Jun. 17, 2022

(65) Prior Publication Data

US 2023/0080930 A1     Mar. 16, 2023

(30) Foreign Application Priority Data

Aug. 25, 2021   (KR) .................. 10-2021-0112541
Nov. 22, 2021   (KR) .................. 10-2021-0161615

(51) Int. Cl.
*G06N 5/022*    (2023.01)
*G06F 16/3329*  (2025.01)
*G06F 40/35*    (2020.01)
*G06N 3/0455*   (2023.01)
*G06N 3/096*    (2023.01)

(52) U.S. Cl.
CPC ......... *G06N 5/022* (2013.01); *G06F 16/3329* (2019.01); *G06F 40/35* (2020.01); *G06N 3/096* (2023.01); *G06N 3/0455* (2023.01)

(58) Field of Classification Search
CPC ...... G06N 5/022; G06N 3/096; G06N 3/0455; G06F 40/35; G06F 16/3329
See application file for complete search history.

(56) References Cited

U.S. PATENT DOCUMENTS

| | | | |
|---|---|---|---|
| 6,571,234 B1 | 5/2003 | Knight et al. |
| 6,731,307 B1 | 5/2004 | Strubbe et al. |
| 6,735,615 B1 | 5/2004 | Iwayama et al. |

(Continued)

FOREIGN PATENT DOCUMENTS

| | | | |
|---|---|---|---|
| CN | 110633357 A | * | 12/2019 |
| CN | 111708871 A | * | 9/2020 |

(Continued)

OTHER PUBLICATIONS

Gou, Jianping, et al. "Knowledge distillation: A survey." International Journal of Computer Vision 129.6 (2021): 1789-1819 (Year: 2021).*

(Continued)

*Primary Examiner* — Daniel C Washburn
*Assistant Examiner* — James Boggs
(74) *Attorney, Agent, or Firm* — Patent Capital Group

(57) ABSTRACT

Disclosed is a method of training a dialogue model in an electronic device, the method including selecting a first context from a first dialogue data set including at least one pair of a context and a response corresponding to the context, generating a first response corresponding to the first context through a first dialogue model, generating an augmented dialogue dataset by incorporating a pair of the first context and the first response corresponding to the first context into the first dialogue data set, and training a second dialogue model based on the augmented dialogue dataset.

15 Claims, 6 Drawing Sheets

(56) References Cited

U.S. PATENT DOCUMENTS

| | | |
|---|---|---|
| 6,804,647 B1 | 10/2004 | Heck et al. |
| 6,804,675 B1 | 10/2004 | Knight et al. |
| 7,277,855 B1 | 10/2007 | Acker et al. |
| 7,685,237 B1 | 3/2010 | Weaver et al. |
| 10,176,819 B2 | 1/2019 | Sun et al. |
| 10,930,263 B1 | 2/2021 | Mahyar |
| 11,615,777 B2 | 3/2023 | Ahn et al. |
| 11,645,547 B2 | 5/2023 | Tian et al. |
| 2002/0120450 A1 | 8/2002 | Junqua et al. |
| 2004/0111271 A1 | 6/2004 | Tischer |
| 2005/0144247 A1 | 6/2005 | Christensen et al. |
| 2006/0149558 A1 | 7/2006 | Kahn et al. |
| 2006/0210034 A1 | 9/2006 | Beadle et al. |
| 2006/0235932 A1 | 10/2006 | Celi, Jr. et al. |
| 2007/0005754 A1 | 1/2007 | Horvitz et al. |
| 2007/0071206 A1 | 3/2007 | Gainsboro et al. |
| 2008/0082333 A1 | 4/2008 | Nurminen et al. |
| 2008/0147385 A1 | 6/2008 | Nurminen et al. |
| 2008/0183473 A1 | 7/2008 | Nagano et al. |
| 2008/0207242 A1 | 8/2008 | Ekberg |
| 2008/0235024 A1 | 9/2008 | Goldberg et al. |
| 2009/0037179 A1 | 2/2009 | Liu et al. |
| 2009/0171657 A1 | 7/2009 | Tian et al. |
| 2009/0177473 A1 | 7/2009 | Aaron et al. |
| 2009/0204510 A1 | 8/2009 | Hwang |
| 2010/0161327 A1 | 6/2010 | Chandra et al. |
| 2012/0189272 A1 | 7/2012 | Kunigita et al. |
| 2012/0226500 A1 | 9/2012 | Balasubramanian et al. |
| 2013/0332167 A1 | 12/2013 | Kilgore |
| 2014/0195227 A1 | 7/2014 | Rudzicz et al. |
| 2014/0303958 A1 | 10/2014 | Lee et al. |
| 2015/0379654 A1 | 12/2015 | Deshmukh et al. |
| 2016/0005403 A1 | 1/2016 | Agiomyrgiannakis et al. |
| 2016/0036962 A1 | 2/2016 | Rand |
| 2016/0098992 A1* | 4/2016 | Renard .................. G10L 15/30 704/275 |
| 2016/0104474 A1 | 4/2016 | Bunn et al. |
| 2016/0203827 A1 | 7/2016 | Leff et al. |
| 2016/0379643 A1 | 12/2016 | Ito et al. |
| 2017/0171509 A1 | 6/2017 | Huang et al. |
| 2017/0171599 A1 | 6/2017 | Peng |
| 2017/0249953 A1 | 8/2017 | Yassa et al. |
| 2017/0301340 A1 | 10/2017 | Yassa et al. |
| 2018/0048865 A1 | 2/2018 | Taylor et al. |
| 2018/0063556 A1 | 3/2018 | Kalmanson et al. |
| 2018/0090126 A1 | 3/2018 | Peterson et al. |
| 2018/0130471 A1 | 5/2018 | Trufinescu et al. |
| 2018/0204576 A1 | 7/2018 | Dhoot et al. |
| 2018/0316964 A1 | 11/2018 | Dillon et al. |
| 2019/0013017 A1* | 1/2019 | Kang ...................... G06N 5/04 |
| 2019/0044985 A1 | 2/2019 | Jo et al. |
| 2019/0079941 A1 | 3/2019 | Sarkar et al. |
| 2019/0221225 A1 | 7/2019 | Bricklin et al. |
| 2019/0251952 A1 | 8/2019 | Arik et al. |
| 2019/0334842 A1 | 10/2019 | Sato |
| 2019/0354594 A1 | 11/2019 | Foster et al. |
| 2020/0013422 A1 | 1/2020 | Matkin |
| 2020/0082807 A1 | 3/2020 | Kim et al. |
| 2020/0193085 A1* | 6/2020 | Tanaka ................. G06F 40/106 |
| 2020/0197810 A1 | 6/2020 | Kung et al. |
| 2020/0265829 A1 | 8/2020 | Liu et al. |
| 2020/0395008 A1 | 12/2020 | Cohen et al. |
| 2021/0043187 A1 | 2/2021 | Ahn et al. |
| 2021/0182489 A1* | 6/2021 | Barkan .................... G06N 3/08 |
| 2022/0199068 A1 | 6/2022 | Ahn et al. |
| 2023/0077528 A1 | 3/2023 | Erdenee et al. |
| 2023/0154453 A1 | 5/2023 | Erdenee et al. |
| 2023/0215418 A1 | 7/2023 | Ahn et al. |
| 2023/0229864 A1 | 7/2023 | Kim et al. |
| 2023/0229964 A1 | 7/2023 | Kim et al. |

FOREIGN PATENT DOCUMENTS

| | | | |
|---|---|---|---|
| CN | 112541060 A | | 3/2021 |
| CN | 117411109 A | * | 1/2024 |
| JP | 2003202885 A | | 7/2003 |
| JP | 2019179257 A | | 10/2019 |
| JP | 2020160319 A | | 10/2020 |
| KR | 20000036463 A | | 7/2000 |
| KR | 20010091677 A | | 10/2001 |
| KR | 20090028151 A | | 3/2009 |
| KR | 101632435 B1 | | 6/2016 |
| KR | 20170107683 A | | 9/2017 |
| KR | 20180059322 A | | 6/2018 |
| KR | 20190008137 A | | 1/2019 |
| KR | 20190085882 A | | 7/2019 |
| KR | 10-2170563 B1 | | 10/2020 |
| KR | 10-2173553 B1 | | 11/2020 |
| WO | 2018074516 A1 | | 4/2018 |
| WO | 2019139430 A1 | | 7/2019 |
| WO | 2019222591 A1 | | 11/2019 |

OTHER PUBLICATIONS

Zhang, Rongsheng, et al. "Dialogue distillation: Open-domain dialogue augmentation using unpaired data." arXiv preprint arXiv:2009.09427 (2020). (Year: 2020).*

Fakoor, Rasool, et al. "Fast, accurate, and simple models for tabular data via augmented distillation." Advances in Neural Information Processing Systems 33 (2020): 8671-8681. (Year: 2020).*

Kim, Yoon, and Alexander M. Rush. "Sequence-level knowledge distillation." arXiv preprint arXiv:1606.07947 (2016). (Year: 2016).*

Adiwardana, Daniel, et al. "Towards a human-like open-domain chatbot." arXiv preprint arXiv:2001.09977 (2020). (Year: 2020).*

European Patent Application 22207004.7 dated Mar. 9, 2023, 9 pgs.

Extended European Search Report for Application No. 20189677.6, Dated Sep. 28, 2020, 9 pgs.

Extended European Search Report for Application No. 22189981.8, mailed Jan. 17, 2023, 9 pgs.

Japanese Office Action for Application No. 2020-134046, Dated Sep. 10, 2021, 8 pgs.

Korean Office Action for Application No. 10-2019-0097398, Dated Aug. 18, 2021, 15 pgs.

Korean Office Action for Application No. 10-2019-0097398, Dated Jun. 25, 2020, 11 pgs.

Office Action for Japanese Patent Application No. 2021-083959 dated Sep. 28, 2022, 2 pgs.

Adiwardana et al., "Towards a Human-like Open-Domain Chatbot", arXiv:2001.09977v3 [cs.CL], Feb. 27, 2020, 38 pgs.

Brown et al., "Language Models are Few-Shot Learners", arXiv:2005.14165v4 [cs.CL], Jul. 22, 2020, 75 pgs.

Cai et al., "Retrieval-guided Dialogue Response Generation via a Matching-to-Generation Framework", Proceedings of the 2019 Conference on Empirical Methods in Natural Language Processing and the 9th International Joint Conference on Natural Language Processing, Hong Kong, China, Nov. 3- 7, 2019, pp. 1866-1875.

Cai et al., "Skeleton-to-Response: Dialogue Generation Guided by Retrieval Memory", arXiv:1809.05296v5 [cs.CL], Feb. 28, 2020, 8 pgs.

Choi et al., "Attentron: Few-Shot Text-to-Speech Utilizing Attention-Based Variable-Length Embedding", ArXiv abs/2005.08484, Aug. 12, 2020 (Version 2), 5 pgs.

Choi et al., "Attentron: Few-Shot Text-to-Speech Utilizing Attention-Based Variable-Length Embedding", ArXiv abs/2005.08484, May 18, 2020 (Version 1), 5 pgs.

Cooper et al., "Zero-Shot Multi-Speaker Text-to-Speech with State-of-the-Art Neural Speaker Embeddings", arXiv:1910.10838v2, Feb. 4, 2020, 5 pgs.

Fan et al., "Augmenting Transformers with KNN-Based Composite Memory for Dialog", Transactions of the Association for Computational Linguistics, vol. 9, Mar. 1, 2021, pp. 82-99, https://doi.org/10.1162/tacl_a_00356.

Fu et al., "Stylistic Retrieval-based Dialogue System with Unparallel Training Data", arXiv:2109.05477, Sep. 12, 2021, 9 pgs.

(56) References Cited

OTHER PUBLICATIONS

Gupta et al., "Controlling Dialogue Generation with Semantic Exemplars", Proceedings of the 2021 Conference of the North American Chapter of the Association for Computational Linguistics: Human Language Technologies, Jun. 6-11, 2021, pp. 3018-3029.

Guu et al., "REALM: Retrieval-Augmented Language Model Pre-Training", arXiv:2002.08909v1 [cs.CL], Feb. 10, 2020, 12 pgs.

Han et al., "Meet Your Favorite Character: Open-domain Chatbot Mimicking Fictional Characters with only a Few Utterances", arXiv:2204.10825, Apr. 22, 2022, 19 pgs.

Holtzman et al., "The Curious Case of Neural Text Degeneration", arXiv:1904.09751v2 [cs.CL], Feb. 14, 2020, 16 pgs.

Hsu et al., "Hierarchical Generative Modeling for Controllable Speech Synthesis", arXiv preprint arXiv:1810.07217v2, Dec. 27, 2018, 27 pgs.

Humeau et al., "Poly-Encoders: Architectures and Pre-Training Strategies for Fast and Accurate Multi-Sentence Scoring", International Conference on Learning Representations, Apr. 30, 2020, 14 pgs.

Kim et al., "Distilling the Knowledge of Large-scale Generative Models into Retrieval Models for Efficient Open-domain Conversation", Findings of the Association for Computational Linguistics, EMNLP 2021, Nov. 7-11, 2021, pp. 3357-3373.

Kim et al., "Sequence-Level Knowledge Distillation", Proceedings of the 2016 Conference on Empirical Methods in Natural Language Processing, Austin, TX, Nov. 1-5, 2016, pp. 1317-1327.

Lee et al., "Robust and Fine-Grained Prosody Control of End-to-End Speech Synthesis", arXiv:1811.02122v2, Feb. 18, 2019, 5 pgs.

Lewis et al., "Retrieval-Augmented Generation for Knowledge-Intensive NLP Tasks", arXiv:2005.11401v4 [cs.CL], Apr. 12, 2021, 19 pgs.

Li et al., "A Diversity-Promoting Objective Function for Neural Conversation Models", Proceedings of NAACL-HLT 2016, San Diego, California, Jun. 12-17, 2016, pp. 110-119.

Li et al., "Don't Say That! Making Inconsistent Dialogue Unlikely with Unlikelihood Training", arXiv:1911.03860v2 [cs.CL], May 6, 2020, 15 pgs.

Liu et al., "How Not To Evaluate Your Dialogue System: An Empirical Study of Unsupervised Evaluation Metrics for Dialogue Response Generation", Proceedings of the 2016 Conference on Empirical Methods in Natural Language Processing, Austin, Texas, Nov. 1-5, 2016, pp. 2122-2132.

Mazare et al., "Training Millions of Personalized Dialogue Agents", arXiv:1809.01984v1 [cs.CL], Sep. 6, 2018, 5 pgs.

Papineni et al., "BLEU: a Method for Automatic Evaluation of Machine Translation", Proceedings of the 40th Annual Meeting of the Association for Computational Linguistics (ACL), Philadelphia, Jul. 2002, pp. 311-318.

Roller et al., "Recipes for Building an Open-Domain Chatbot", arXiv:2004.13637v2 [cs.CL], Apr. 30, 2020, 25 pgs.

Serban et al., "Multiresolution Recurrent Neural Networks: An Application to Dialogue Response Generation", arXiv:1606.00776v2 [cs.CL], Jun. 14, 2016, 21 pgs.

Welleck et al., "Neural Text Degeneration with Unlikelihood Training", arXiv:1908.04319v2 [cs.LG], Sep. 26, 2019, 17 pgs.

Weston et al., "Retrieve and Refine: Improved Sequence Generation Models For Dialogue", arXiv:1808.04776v2 [cs.CL], Sep. 6, 2018, 6 pgs.

Wu et al., "Response Generation by Context-aware Prototype Editing", arXiv:1806.07042v4 [cs.CL], Nov. 16, 2018, 9 pgs.

Yang et al., "A Hybrid Retrieval-Generation Neural Conversation Model", arXiv:1904.09068v1 [cs.IR], Apr. 19, 2019, 11 pgs.

Zhang et al., "DIALOGPT: Large-Scale Generative Pre-training for Conversational Response Generation", Proceedings of the 58th Annual Meeting of the Association for Computational Linguistics, Jul. 5-10, 2020, pp. 270-278.

Zhang et al., "Dialogue Distillation: Open-Domain Dialogue Augmentation Using Unpaired Data", Proceedings of the 2020 Conference on Empirical Methods in Natural Language Processing, Nov. 16-20, 2020, pp. 3449-3460.

* cited by examiner

DIALOGUE MODEL TRAINING METHOD AND DEVICE THEREFOR

CROSS-REFERENCE TO RELATED APPLICATION(S)

This application claims the benefit of Korean Patent Application No. 10-2021-0112541, filed on Aug. 25, 2021, and Korean Patent Application No. 10-2021-0161615, filed on Nov. 22, 2021, in the Korean Intellectual Property Office, the disclosures of which are incorporated herein by reference.

BACKGROUND

1. Field of the Disclosure

The present disclosure relates to a method of training a user dialogue model and a device therefor.

2. Description of the Related Art

With the development of artificial intelligence technology, people are able to communicate with chatbots as virtual characters rather than real people. The chatbot may search for and output a predetermined response according to a predetermined conversation topic, or may generate and output an appropriate response for a free conversation topic. A conversation in which a specific conversation topic is not determined may be referred to as an open domain conversation.

To derive responses from the open domain conversation, two types of dialogue models, a generative-based dialogue model and a retrieval-based dialogue model are used. The generative-based dialog model is a model that generates an appropriate response based on an input dialog context and returns the response as an answer. The retrieval-based dialog model is a model in which a response set that can be used as an answer is defined in advance, and an answer most appropriate to the input dialog context is retrieved from the response set and returned as an answer.

When a large-scale language model is used together, the generative-based dialogue model may generate a response suitable for a given dialogue context based on rich knowledge of the corresponding language model. However, the generative-based dialogue model has high latency in generating responses because a decoder of a sequence-to-sequence structure spends a lot of time in an autoregressive decoding process. In a real conversation situation, the chatbot needs to return an answer to a user in real time, so the heavy and slow characteristics of the generative-based dialogue are difficult to apply to the open domain conversation.

In contrast, the retrieval-based dialogue model may return an appropriate response to a given context much faster than the generative-based dialogue model when used in conjunction with high-performance search libraries. However, since the retrieval-based dialogue model may return only responses that exist in the pre-defined response set, if the response set does not contain an appropriate response to the input conversation context, an incorrect response may be returned that is not related to the conversation being conducted. In addition, the retrieval-based dialog model is highly dependent on a pre-defined response set and thus, may return less fluent responses compared to the generative-based dialogue model.

SUMMARY

An aspect provides a method for generating a response to a dialogue context through a generative-based dialogue model and building a response set for a retrieval-based dialogue model based on the generated response, thereby reducing a high response latency of the generative-based dialogue model.

Another aspect also provides a method for generating a response to a dialogue context through a generative-based dialogue model and training a retrieval-based dialogue model based on the generated response, thereby compensating for a relatively low response quality of the retrieval-based dialogue model.

However, the goals to be achieved by example embodiments of the present disclosure are not limited to the technical aspects described above, and other goals may be inferred from the following example embodiments.

According to an aspect, a method of training a dialogue model in an electronic device is provided, the method including selecting a first context from a first dialogue data set including at least one pair of a context and a response corresponding to the context, generating a first response corresponding to the first context through a first dialogue model, generating an augmented dialogue dataset by incorporating a pair of the first context and the first response corresponding to the first context into the first dialogue data set, and training a second dialogue model based on the augmented dialogue dataset.

According to another aspect, a method of training a dialogue model in an electronic device is provided, the method including acquiring, from a first dialogue data set, a response set including a first response subset corresponding to a first context and a second response subset selected arbitrarily, calculating a first score for a response included in the response set with respect to the first context based on a first dialogue model, calculating a second score for a response included in the response set with respect to the first context based on a second dialogue model, and training the second dialogue model based on the first score and the second score.

According to still another aspect, an electronic device for training a dialogue model is provided, the electronic device comprising a storage device and a controller, wherein the controller is configured to acquire a response set including a first response subset corresponding to a first context and a second response subset selected arbitrarily, from a first dialogue data set through the storage device, calculate a first score for a response included in the response set with respect to the first context based on a first dialogue model, calculate a second score for a response included in the response set with respect to the first context based on a second dialogue model, and train the second dialogue model based on the first score and the second score.

Details of other example embodiments are included in the following detailed description and the accompanying drawings.

DETAILED DESCRIPTION

Figure 1:
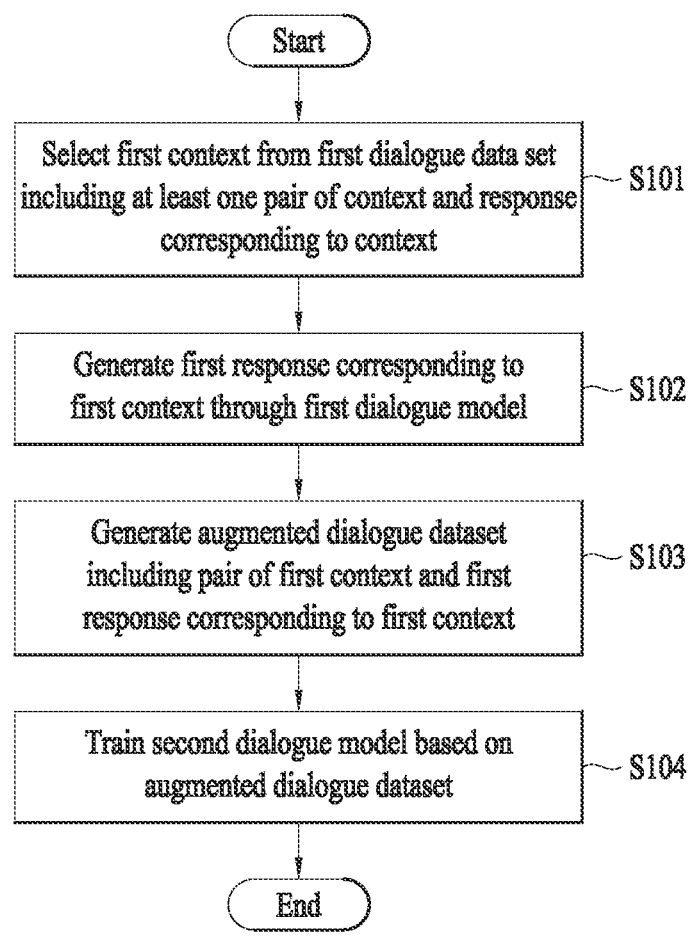
FIG. 1 is a flowchart illustrating a method of training a data-level dialogue model according to an example embodiment.

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant in the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" or "comprising" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; or all three of A, B, and C together.

The term "terminal" mentioned below may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

A task of open-domain conversation, which is a technical field of the present disclosure, has been studied based on retrieval models, generative models, or using both. While retrieval models search for a response relevant to a given context from a pre-defined response set, generative models produce a response based on the given context with auto-regressive decoding. It is known that the retrieval and generative models have advantages in the efficiency of inference and quality of generated responses, respectively. To take both advantages, several exemplar-based generative models have recently been proposed by combining the retrieval and generative models. A main difference between the training method proposed in the present disclosure and the exemplar-based generative models is that exemplar-based generative models provide the knowledge of retrieval models to generative models, while the proposed training method transfers the knowledge of generative models to retrieval models to focus on the efficiency of open-domain conversation systems.

More specifically, despite outstanding performance in open-domain conversation, it is known that large-scale generative models are less practical for building real-time conversation systems due to high latency. In contrast, retrieval models may return responses with much lower latency but show inferior performance compared to the large-scale generative models since the conversation quality is bounded by the pre-defined response set. To take advantage of both approaches, a training method called generative-to-retrieval distillation (G2R) that preserves the efficiency of a retrieval model while leveraging the conversational ability of a large-scale generative model by infusing the knowledge of the generative model into the retrieval model is proposed. G2R may include two distinct techniques of distillation, that is, data-level G2R and model-level G2R. The data-level G2R augments the dialogue dataset with additional responses generated by the large-scale generative model. The model-level G2R transfers the response quality score assessed by the generative model to the score of the retrieval model by the knowledge distillation loss. Through extensive experiments including human evaluation, the retrieval-based conversation system trained with the G2R of the present disclosure shows a substantially improved performance compared to the baseline retrieval model while showing significantly lower inference latency than the large-scale generative models.

To this end, in example embodiments, systems may select at least a portion of contexts from dialogue datasets including context-response pairs for training a retrieval model, generate a response using a generative model, generate a new context-response pair, and train the retrieval model using an augmented dialogue dataset of the generated context-response pair so that the retrieval model generates more diverse responses.

In addition, in example embodiments, systems may identify a plurality of response sets for a predetermined context, obtain a score of each response of the response sets through different models, and train one model to reduce a score difference of the response sets of the models. More specifically, a generative model may be a teacher model, and a retrieval model may be a student model. In this case, the performance of the retrieval model may be improved by obtaining a cross-entropy loss of a score for a response set and training the retrieval model to reduce a difference between the scores.

In the following description, example embodiments of the present disclosure will be described in detail with reference to the drawings so that those skilled in the art can easily carry out the present disclosure. However, the present disclosure may be implemented in various different forms but it is not limited to the exemplary embodiments described herein. In addition, terms such as "first" and "second" are only used to distinguish one element from another element, and these elements are not to be limited by these terms.

FIG. 1 is a flowchart illustrating a method of training a data-level dialogue model according to an example embodiment.

In operation S101, a first context may be selected from a first dialogue data set including at least one pair of a context and a response corresponding to the context. According to an example embodiment, a response of the first dialogue data set may be a response included in a pre-defined response set.

In operation S102, a first response corresponding to the first context may be generated through a first dialogue model. According to an example embodiment, the first dialogue model may be a generative-based dialogue model that generates a response to a given context.

In operation S103, an augmented dialogue dataset including a pair of the first context and the first response corresponding to the first context may be generated. According to an example embodiment, the dialogue model training method of the present disclosure may generate an augmented response set including the response of the first dialogue data set and the generated first response and use the augmented response set as a fixed response set for a dialogue context input thereafter.

In operation S104, a second dialogue model may be trained based on the augmented dialogue dataset. According to an example embodiment, the second dialogue model may be a retrieval-based dialogue model that retrieves a response to the given context.

According to an example embodiment, the second dialogue model may be trained by identifying a second context included in the augmented dialogue dataset and acquiring a response set including a first response subset corresponding to the second context and a second response subset selected arbitrarily. In addition, a first score for a response included in a response set with respect to the second context may be calculated based on the first dialogue model, and a second score for a response included in the response set with respect to the second context may be calculated based on the second dialogue model. Also, the second dialogue model may be trained based on the first score and the second score. In this instance, by calculating a loss for the second score based on the first score, the second dialogue model may be trained such that the loss is minimized. Examples of scoring a response in accordance with a number of embodiments of the invention are described in greater detail below.

Figure 2:
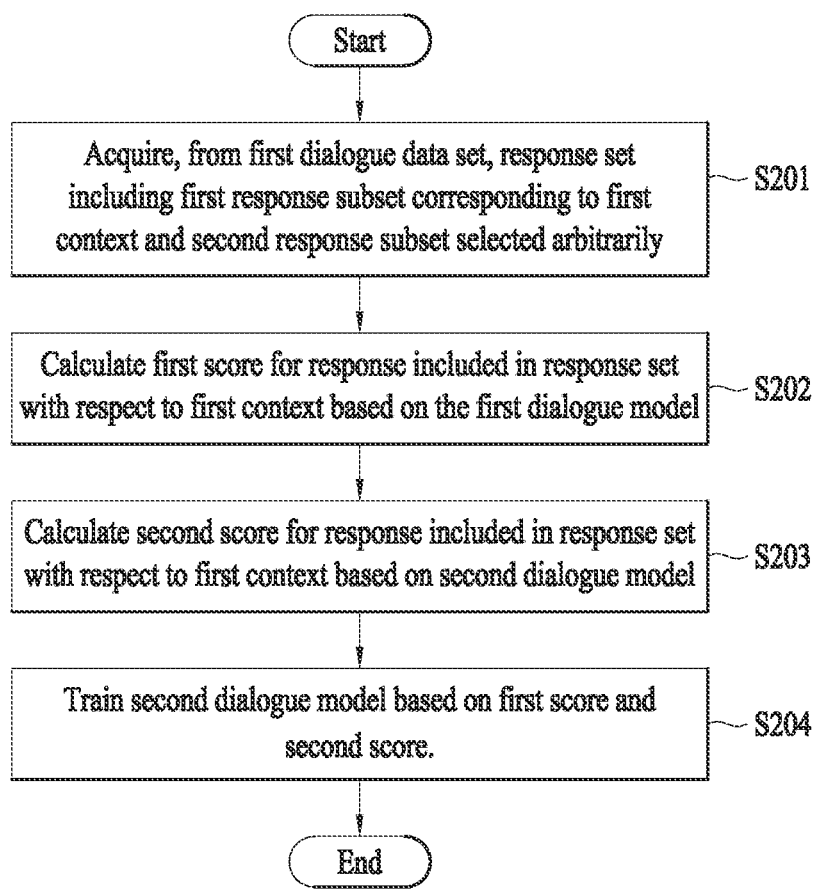
FIG. 2 is a flowchart illustrating a method of training a model-level dialogue model according to an example embodiment.

FIG. 2 is a flowchart illustrating a method of training a model-level dialogue model according to an example embodiment.

In operation S201, a response set including a first response subset corresponding to a first context and a second response subset selected arbitrarily may be acquired from a first dialogue data set. According to an example embodiment, a second context may be selected from a second dialogue data set including at least one pair of a context and a response corresponding to the context, a response corresponding to the second context may be generated through a first dialogue model, and the first dialogue data set may be generated by incorporating a pair of the second context and the response corresponding to the second context into the second dialogue data set. Accordingly, the first dialogue data set may be an augmented dialogue dataset.

In operation S202, a first score for a response included in the response set with respect to the first context may be calculated based on the first dialogue model. According to an example embodiment, the first score may be calculated using a normalized log-likelihood based on a length of each response included in the response set. Alternatively, or conjunctively, the first score may be calculated based on a mutual information score with respect to the first context for each response included in the response set.

In operation S203, a second score for a response included in the response set with respect to the first context may be calculated based on the second dialogue model. According to an example embodiment, the second score may be calculated by encoding the first context and a response included in the response set based on fixed-length embedding and calculating a relevance score with respect to the first context for each response included in the response set based on an embedding value corresponding to the first context and an embedding value corresponding to each response included in the response set.

In operation S204, the second dialogue model may be trained based on the first score and the second score. According to an example embodiment, a loss may be calculated based on the first score and the second score, and the second dialogue model may be trained such that the loss is minimized. In this instance, the loss may include a cross-entropy loss for a score corresponding to the first response subset and a knowledge distillation loss for a score corresponding to a response included in the response set. In some embodiments, the second dialogue model may be trained by maximizing a score corresponding to the first response subset so that the cross-entropy loss is minimized. In several embodiments, the second dialogue model may be trained by matching the first score and the second score so that the knowledge distillation loss is minimized.

Hereinafter, a retrieval-based dialogue model may also be referred to as a "retrieval model" and a generative-based dialogue model may also be referred to as a "generative model."

Recently, generative models have shown great success in open-domain conversation along with the development of large-scale language models, yielding fluent and informative responses. However, generative models suffer from the challenges of latency and computational resources for building real-time conversation systems due to auto-regressive decoding for response generation and a large GPU memory footprint.

Meanwhile, retrieval models such as a bi-encoder and a poly-encoder are able to build efficient open-domain conversation systems by pre-defining the response set and searching for the most relevant response to the given context from the response set. In addition, a bi-encoder dramatically reduces the latency when adopting efficient maximum inner product search (MIPS) libraries, such as FAISS and ScaNN. Despite the outstanding efficiency, retrieval models have shown a lack of conversational ability compared to generative models. Retrieval models are known to return an erroneous response when the pre-defined response set does not contain the proper response to the given context, while generative models deal with these cases more flexibly.

Exemplar-based generative models try to mitigate this problem by combining the advantages of the two approaches, whereas the inherent inefficiency of the generative models remains since exemplar-based generative models employ a generative model for response generation. To make an efficient yet fluent open-domain conversation system, which is desirable for real world applications, the present disclosure proposes a training method for retrieval models called generative-to-retrieval distillation (G2R).

According to an example embodiment, G2R enables retrieval models to leverage the knowledge of large-scale generative models at both data-level and model level. In a variety of embodiments, data-level G2R can augment the original dialogue dataset with the responses produced by a large-scale generative model using contexts in the original dialogue dataset. Then, the produced responses are also added to the pre-defined response set. The augmented dialogue dataset and response set are utilized for training a retrieval model at the training phase and for returning responses at the inference phase, respectively. Although the data-level G2R enables the retrieval model to utilize high-quality responses generated by the large-scale generative model, it does not transfer the fine-grained knowledge from the generative model about the quality of individual responses. Model-level G2R resolves this limitation by transferring the response quality scores assessed by the large-scale teacher generative model into the scores of the student retrieval model. This method induces the retrieval model to select a better response in terms of the response quality.

Transferring the knowledge from larger-scale teacher neural networks into smaller-scale student neural networks has been implemented to improve the performance of the student model, including data augmentation and knowledge distillation. In the data augmentation perspective, several works utilize the generation result of pre-trained language models as a labeled example for text classification tasks. Some studies utilize the inference result of the retrieval model and the generative model as a semi-negative dataset for training a student retrieval model. Meanwhile, Knowledge distillation transfers the knowledge of the teacher model into the student model by matching the student logits with softened teacher logits. There is knowledge distillation, which is specially designed for model architectures or specific tasks such as sequence generation tasks, retrieval models, and transformer architectures.

The most closely related work to the present disclosure is dialogue distillation, which also proposes data-level and model-level distillation for open-domain conversation models. However, the dialogue model training method of the present disclosure differs from the dialogue distillation in three ways. First, the dialogue distillation requires additional unpaired text corpus, which may be hard to be obtained in certain circumstances. Instead, the dialogue distillation task focuses on utilizing the knowledge of large-scale generative models for augmenting additional data. In addition, the dialogue distillation does not enrich the pre-defined response set, which is important to improve the performance of the retrieval models, as shown in the experiment result obtained from the dialogue model training method of the present disclosure. Last but not least, while the dialogue distillation only considers the distillation within the homogeneous architecture, generative-to-generative or retrieval-to-retrieval, the dialogue model training method of the present disclosure focuses on the model-level distillation between heterogeneous architectures, specifically generative-to-retrieval, to take advantages of each architecture.

Figure 3:
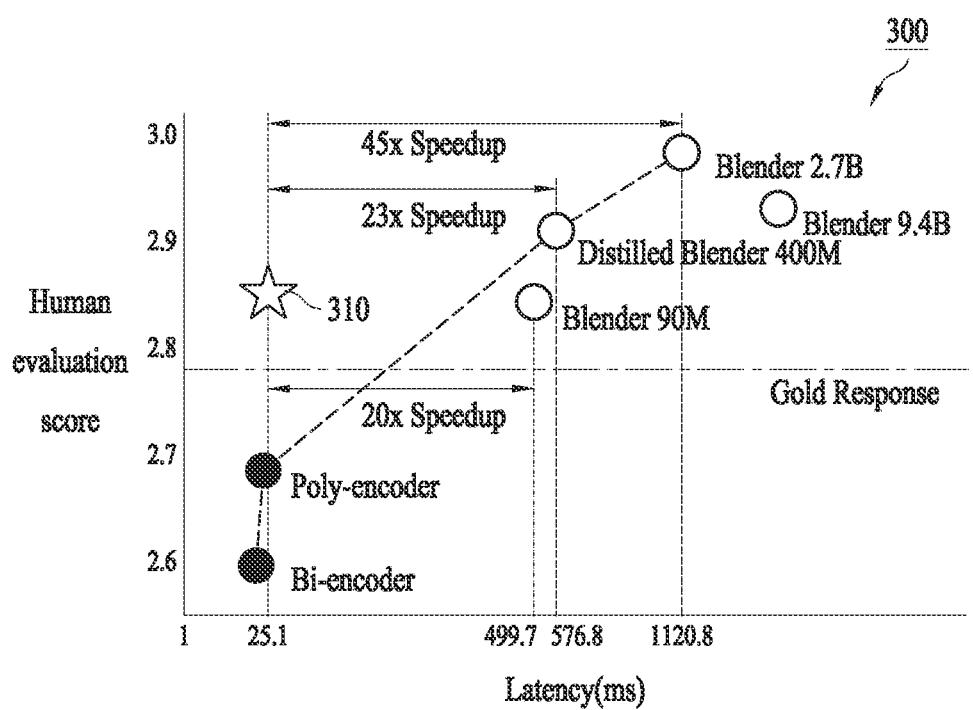
FIG. 3 is a graph showing a latency-to-human evaluation score for open-domain conversation models.

FIG. 3 is a graph 300 showing a latency-to-human evaluation score for open-domain conversation models. Blank circles indicate generative-based dialogue models, and filled circles indicate retrieval-based dialogue models. Star 310 indicates a dialogue model, which may be a G2R trained based on the dialogue model training method of the present disclosure in accordance with many embodiments of the invention. It can be seen from FIG. 3 that the dialogue model of the present disclosure achieves a "sweet-spot" among various models, showing a much better human evaluation score than retrieval-based dialogue models and demonstrating much lower latency than generative-based dialogue models.

A retrieval based conversation system including the G2R-applied retrieval model and a MIPS library shows a substantial conversational ability while showing fast inference speed, as illustrated in FIG. 3. For example, the retrieval-based conversation system of the present disclosure shows about a 20× speedup compared to a blender model (90M parameters) while exhibiting a comparable human evaluation result on conversational ability. Here, the blender model, which is the state-of-the-art model in open-domain conversation task, is adopted with various parameters such as Blender 90M, Blender 2.7B, and Blender 9.4B. For response generation, the blender model follows a decoding hyperparameter.

Figure 4:
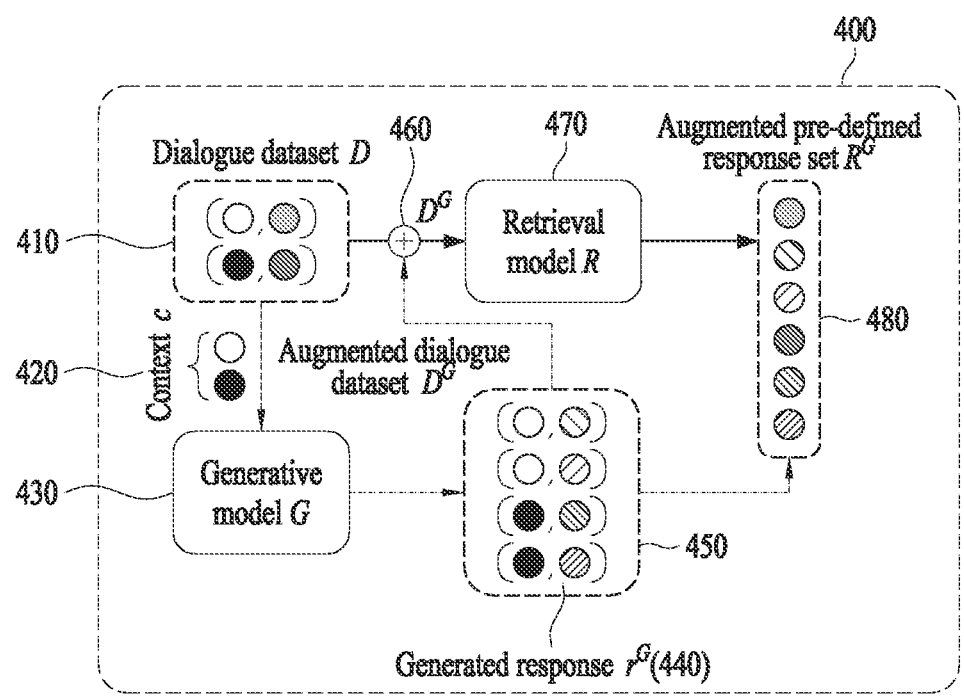
FIG. 4 is a diagram illustrating a method of training a data-level dialogue model according to an example embodiment.

FIG. 4 is a diagram illustrating a method of training a data-level dialogue model according to an example embodiment.

To better understand the method illustrated in FIG. 4, a retrieval model for open-domain conversation is first described. Equation 1 represents a dialogue dataset that includes n context-response pairs, where $c_i$ and $r_i$ are respectively a context and a gold response corresponding to the context in an i-th example, where the gold response is an appropriate response. At the training phase, retrieval models may be trained to maximize the score of the gold response $r_i$ for the given context $c_i$ compared to the scores of negative responses. At the inference phase, retrieval models may return the response with the highest score for the given context c from the pre-defined response set R constructed from the dialogue dataset D. Equation 2 represents the pre-defined response set R including n responses.

$$D=\{(c_i,r_i)|1\leq i\leq n\} \qquad \text{[Equation 1]}$$

$$R=\{r_i|1\leq i\leq n\} \qquad \text{[Equation 2]}$$

Knowledge Distillation is a method of transferring the knowledge of the teacher model into the student model by adding a loss that matches the logits of the student model $z_s$ with the logits of the teacher model $z_t$. For classification task with one class, the knowledge distillation loss is defined by the cross-entropy between the softened output probability of the student model and the teacher model. Equation 3 represents the knowledge distillation loss $L_{KD}$.

$$\mathcal{L}_{KD} = -\sum_{x\in X}\sum_{i=1}^{l} p_t(y_i \mid x)\log p_s(y_i \mid x) = \qquad \text{[Equation 3]}$$

$$-\sum_{x\in X}\sum_{i=1}^{l}\left[\frac{\exp(z_t(x, y_i)/T)}{\sum_j \exp(z_t(x, y_j)/T)} \times \log \frac{\exp(z_s(x, y_i)/T)}{\sum_j \exp(z_s(x, y_j)/T)}\right],$$

In Equation 3, p(y|x) and z(x, y) are the softened probability and logit value of the models for an input x and a class y, respectively, and T is a temperature parameter for smoothing the logit values.

A goal of the present disclosure is to create an efficient open-domain conversation system based on the retrieval model. However, simply utilizing the retrieval model may lead to the low efficiency when the size of the response set R is large since the retrieval model has to calculate scores for all response candidates. To solve this, processes in accordance with certain embodiments of the invention may adopt the bi-encoder model with an efficient MIPS library to select proper responses efficiently without calculating a score for all response candidates. Specifically, the bi-encoder may encode a context c and a response r into the fixed-length embedding respectively with the transformer architecture, and defines the relevance score between c and r as the dot-product of two embeddings. Through this, the retrieval process speed may be increased.

Meanwhile, utilizing an additional high-quality dialogue dataset is helpful for improving the performance of the retrieval model. Moreover, enriching the pre-defined response set R with more diverse responses may help the retrieval model to respond appropriately to a variety of input contexts since it widens the opportunity to select an appropriate response. However, it is highly labor-intensive and costly to acquire such high-quality dialogue datasets or responses through human-in-the-loop annotation.

Well-tuned large-scale generative models are able to achieve near-human conversational ability. From these observations, the dialogue model training method of the present disclosure leverages the generation result of large-scale generative models to expand the response set as well as the dialogue dataset for training a retrieval model.

For each context $c_i$ in the dialogue dataset D, a large-scale generative model G may generate m responses $r^G_{i,j}$. Equation 4 represents the responses $r^G_{i,j}$.

$$\{r^G_{i,j}\}_{1 \leq j \leq m} \quad \text{[Equation 4]}$$

Considering the generated responses as a gold response of the given context $c_i$, they are added to the dialogue dataset D and the pre-defined response set R as shown in Equation 5. In Equation 5, $D^G$ and $R^G$ denote the augmented dialogue dataset and the augmented response set, respectively.

$$D^G = D \cup \{(c_i, r^G_{i,j}) | 1 \leq i \leq n, 1 \leq j \leq m\} \text{ and}$$

$$R^G = R \cup \{r^G_{i,j} | 1 \leq i \leq n, 1 \leq j \leq m\} \quad \text{[Equation 5]}$$

After the dialogue data set and response set are augmented, a retrieval model R may be trained by minimizing the cross-entropy loss $L_{CE}$ which maximizes the probability of selecting the ground-truth response r among the set of randomly sampled negative responses $R^-$. Equation 6 represents the cross-entropy loss $L_{CE}$.

$$\mathcal{L}_{CE} = -\sum_{(c,r) \in D^G} \log \frac{\exp(\mathcal{R}(c, r))}{\sum_{r^- \in \{r\} \cup R^-} \exp(\mathcal{R}(c, r^-))} \quad \text{[Equation 6]}$$

In Equation 6, R(c, r) is the score computed by the retrieval model R for the given context c and response r. Also, in Equation 6, $R^-$ is created differently for every iteration by randomly sampling responses from $R^G$ without replacement. For example, the largest open-domain conversation model available, Blender 9.4B, may be used as the large-scale generative model G. Since beam search tends to generate similar responses within the same context, top-k sampling may be applied to achieve the diversity of responses. In addition, the responses may be sampled multiple times with different minimum length constraints to diversify the specificity and length of generated responses.

Referring to a data-level dialogue model training model 400 of FIG. 4, first, a generative model G 430 may be trained using a dialogue data set D 410 including at least one pair of a given context and a response corresponding to the given context. For this, a predetermined context c 420 may be extracted from the dialogue data set D 410 and used as an input of the generative model G 430. According to an example embodiment, a context and a response corresponding to the context in the dialogue data set D 410 may be a response that has been returned for the given context by an existing retrieval model R 470 through a retrieval. The generative model G 430 may be a generative model based on a large-scale language model.

According to an example embodiment, the generative model G 430 may generate a new response $r^G$ 440 using the context c 420 as an input. Through this, the generative model G 430 may generate a new dialogue data set 450 including at least one pair of the context c 420 and the new response $r^G$ 440 corresponding to the context c 420. Subsequently, an augmented dialogue dataset $D^G$ 460 may be generated by combining the dialogue data set D 410 and the new dialogue data set 450. The augmented dialogue dataset $D^G$ 460 may be used as an input of a model-level dialogue model training model in FIG. 4 as follows. The retrieval model R 470 may be trained using the augmented dialogue dataset $D^G$ 460. Meanwhile, the new response $r^G$ 440 may be added to an existing response set so as to be constructed into an augmented pre-defined response set $R^G$ 480. After that, when any context is input to a dialogue model, the retrieval model R 470 may return an appropriate response by retrieving the augmented pre-defined response set $R^G$ 480.

Figure 5:
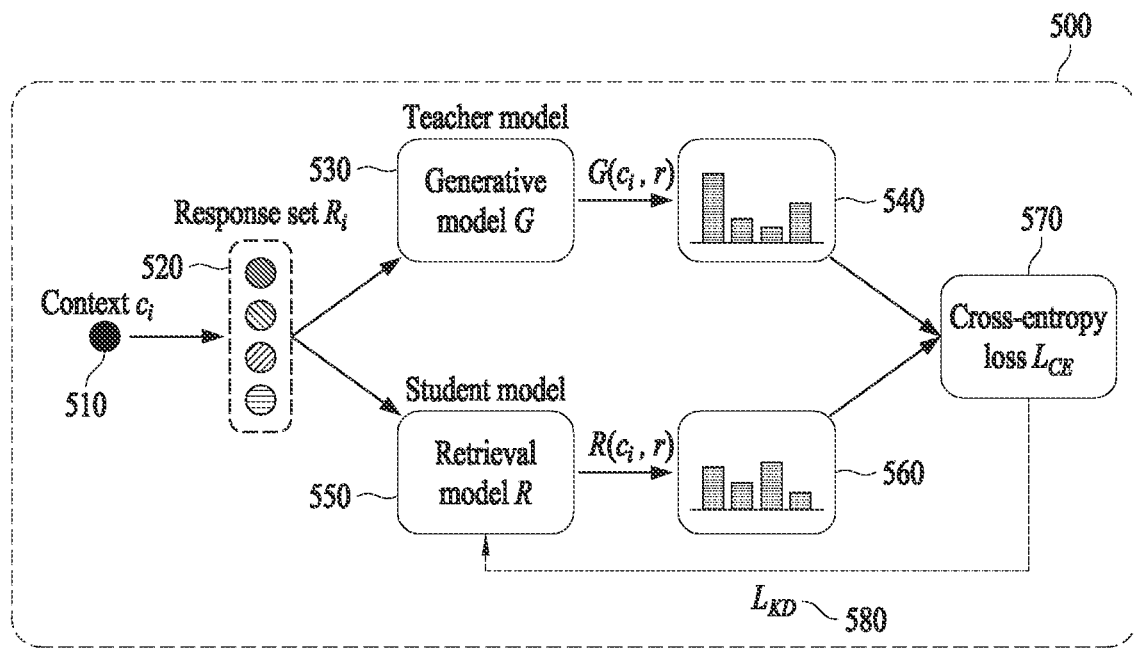
FIG. 5 is a diagram illustrating a method of training a model-level dialogue model according to an example embodiment.

FIG. 5 is a diagram illustrating a method of training a model-level dialogue model according to an example embodiment.

While a data-level dialogue model training method provides additional high-quality dialogue data and diverse responses, it does not transfer the fine-grained knowledge about the quality of the individual responses from the large-scale generative model G. A model-level dialogue model training method of the present disclosure is designed to address this problem. To solve the problem, according to an example embodiment, the data-level dialogue model training method may transfer the individual response-level quality score, assessed by the large-scale teacher generative model G, into the student retrieval model R.

Specifically, from the perspective of the teacher generative model G, the quality score of the response is denoted as G(c, r). Then, the student retrieval model may be trained to match the score R(c, r) of the student retrieval model with the score G(c, r) of the teacher generative model, similar to the typical knowledge distillation technique.

According to an example embodiment, the score G(c, r) of the teacher generative model may be defined based on the log-likelihood normalized by the length of response as shown in Equation 7.

$$\mathcal{G}(c,r) = (\log P_\mathcal{G}(r|c))/|r| \quad \text{[Equation 7]}$$

In Equation 7, $P_G(r|c)$ is the probability of the response r for the given context c of the generative model G and |r| is the number of tokens in the response r. Log-likelihood may be normalized with the length of response to mitigate the problem of preferring shorter responses. The distillation loss $L_{KD}$ may be derived by assigning the score G(c, r) of the teacher generative model and the score R(c, r) of the student retrieval model as the logits of teacher and student models, respectively. Accordingly, Equation 6 may be changed to Equation 8 as shown below.

$$P^{KD}_\mathcal{G}(c_i, r) = \frac{\exp(\mathcal{G}(c_i, r)/T)}{\sum_{r' \in R_i \cup R^-} \exp(\mathcal{G}(c_i, r')/T)},$$

$$P^{KD}_\mathcal{R}(c_i, r) = \frac{\exp(\mathcal{R}(c_i, r)/T)}{\sum_{r' \in R_i \cup R^-} \exp(\mathcal{R}(c_i, r')/T)},$$

$$\mathcal{L}_{KD} = -\sum_{i=1}^{n} \sum_{r \in R_i \cup R^-} P^{KD}_\mathcal{G}(c_i, r) \log P^{KD}_\mathcal{R}(c_i, r)$$

$$R_i = \{r_i, r^G_{i,1}, \ldots, r^G_{i,m}\}$$

[Equation 8]

In Equation 8, $R_i$ is a set of positive responses corresponding to the context $c_i$ of $D^G$.

Since calculating the score $G(c_i, r^-)$ of the teacher generative model for negative responses requires heavy extra computation, the calculation may be simplified through approximation on randomly sampled negative responses $r^-\in R^-$ as shown in Equation 9.

$$P_{\mathcal{G}}^{KD}{}_{(c_i,r^-)\approx 0, \exp \mathcal{G}(c_i,r^-)/T)\approx 0} \quad \text{[Equation 9]}$$

According to Equation 10, a final loss L for the model-level dialogue model training method may be represented as a sum of original cross-entropy loss $L_{CE}$ of Equation 6 and the knowledge distillation loss $L_{KD}$ where the hyperparameter a controls the weights of each term.

$$\mathcal{L} = \alpha \mathcal{L}_{CE} + (1-\alpha)\mathcal{L}_{KD} \quad \text{[Equation 10]}$$

Referring to a model-level dialogue model training model 500 of FIG. 5, first, a response set $R_i$ 520 corresponding to a context $c_i$ 510 may be constructed. According to an example embodiment, the context $c_i$ 510 may be a context included in the augmented dialogue dataset $D^G$ 460 of FIG. 4. In addition, the response set $R_i$ 520 may include an appropriate positive response for the context $c_i$ 510 in the new response $r^G$ 440 and one or more random responses (negative responses) randomly selected from the new response $r^G$ 440, excluding the positive responses. In some cases, the response set $R_i$ 520 may include only one positive response.

Next, based on the response set $R_i$ 520, a generative model G 530 corresponding to a teacher model and a retrieval model R 550 corresponding to a student model may return responses for the context $c_i$ 510. A score $G(c_i, r)$ 540 for the response returned by the generative model G 530 with respect to the context $c_i$ 510 may be identified for each response included in the response set $R_i$ 520. Likewise, a score $R(c_i, r)$ 560 for the response returned by the retrieval model R 550 with respect to the context $c_i$ 510 may be identified for each response included in the response set $R_i$ 520.

According to an example embodiment, the generative model G 530 may calculate the score $G(c_i, r)$ 540 by calculating log-likelihood normalized by a length of a response r. In addition, the retrieval model R 550 may encode the context $c_i$ 510 and the response r based on fixed-length embedding. Also, the generative model G 530 may define a relevance score between the context $c_i$ 510 and the response r as a dot-product of two embeddings so as to be defined as the score $R(c_i, r)$ 560.

According to an example embodiment, a cross-entropy loss $L_{CE}$ 570 that represents a probability of selecting a positive response from the response set $R_i$ 520 may be calculated based on each of the score $G(c_i, r)$ 540 and the score $R(c_i, r)$ 560. For example, the generative model G 530 is based on a large-scale language model and thus, may be more likely to select the positive response instead of the negative response. Accordingly, to maximize the probability of selecting a ground-truth response for randomly sampled negative responses, the retrieval model R 550 may be trained to minimize the cross-entropy loss $L_{CE}$ 570. Also, a distillation loss $L_{KD}$ 580 may be derived by applying the score $G(c_i, r)$ 540 and the score $R(c_i, r)$ 560 as logits of the teacher and student models. The retrieval model R 550 may be trained by matching the score $G(c_i, r)$ 540 and the score $R(c_i, r)$ 560 such that the distillation loss $L_{KD}$ 580 is minimized. Meanwhile, in the example embodiment, the description is made based on a case in which the training is performed to match the scores. However, it is merely an example, and the scores of the two models may not match as a result of training.

Hereinafter, an evaluation for a case in which the open-domain conversation is performed using the dialogue model training method of the present disclosure and a result of the evaluation will be described.

As to the data set, open-domain conversation datasets including Blended Skill Talk, ConvAI2, Empathetic Dialogues, and Wizard of Wikipedia may be used. In an experiment, the four datasets are used together, and a merged dataset may be referred to as BST+.

A human evaluation was carried out on 200 examples randomly sampled from the BST+ test dataset. Human judges evaluated the quality of the generated response with two criteria on a 0-2 scale. First, appropriateness (Appr.) for evaluating whether the generated response is fluent, logical, and appropriate to its given context was evaluated. Also, informativeness (Info.) indicating whether the generated response has meaningful information relevant to its given context was evaluated. Each example is rated by at least three unique human judges, and all the human evaluation is performed via Amazon Mechanical Turk.

Also, through the experiment, various kinds of automated metrics may be reported. MaUdE is an unreferenced dialogue response evaluation metric calculated by the model that is trained to score positive responses as "1" while scoring syntactically and semantically negative responses as "0", using the ConvAI2 dataset. Since MaUdE shows a high correlation with human judgments on fluency and interestingness of responses, MaUdE may be used as a proxy metric for evaluating the overall quality of responses produced by each model. For measuring the lexical diversity of generated responses, Dist-2 and Dist-3 may be used. Dist-n is a ratio of distinct n-grams to the total number of n-grams in all the responses generated by each model. Length, the average number of tokens in generated responses, is reported for reference. Last but not least, to verify the efficiency of the model of the present disclosure, the experiment measures and reports the latency for generating a response for a single input context. Although the latency measured on the GPU-enabled environment is reported in general, the latency measured by using only the CPU may also be reported.

A small blender model distilled from a larger generative model is employed to compare the model-level dialogue model training method of the present disclosure with a generative model that also utilizes the knowledge distillation technique. Here, a 400M parameters blender model distilled from Blender 2.7B is used along with TinyBERT style distillation, denoted as a distilled blender. Meanwhile, the bi-encoder and poly-encoder with 256M parameters pre-trained with the Pushshift Reddit comment dataset and fine-tuned on the BST+ dataset, are the baselines for retrieval models. As described above, the bi-encoder model integrated with MIPS library is denoted as Bi-encoder(w/ FAISS). RetNRef is an exemplar-based generative model which incorporates the response of retrieval models into the input of the generative model. Contrary to G2R, which is one of the dialogue model training models of the present disclosure, RetNRef exploits the retrieval model to make the generative model better, while the G2R exploits the knowledge of the generative model to make the retrieval model better. Specifically, the G2R uses the dialogue retrieval model trained with the a-blending technique. According to an example embodiment, a human response refers to the ground-truth label annotated in the BST+ dataset.

In the dialogue model training method of the present disclosure, the bi-encoder R is trained with the G2R using Blender 9.4B as the teacher generative model G. G2R-DM denotes a model trained with the data-level G2R and the model-level G2R. For a comprehensive analysis, two variants are adopted in the present disclosure. For example, G2R-D is trained with the data-level G2R only, and G2R-D (excluding FAISS) further removes the use of the MIPS library, FAISS, from G2R-D.

Table 1 represents the human evaluation result and the automated metrics among various dialogue models of the open-domain conversation, where a latency (speedup) column denotes the relative speedup of each model compared to the latency of Blender 90M. It can be seen from Table 1 that a system trained with the dialogue model training method (G2R) achieves a "sweet-spot" between conversational ability and efficiency. The system of the present disclosure maintains the low latency of Bi-encoder(w/FAISS) while boosting up the human evaluation results significantly, achieving comparable or better human evaluation scores than the Blender 90M and human responses, respectively.

Blender 90M model while running much faster. While G2R-DM shows a relatively deficient human evaluation score compared to the bigger blender generative models, it shows substantially lower latency (23.0× speedup over Distilled Blender, and 44.7× speedup over Blender 2.7B). In addition, G2R-DM exhibits a much higher response diversity compared to the blender generative models. In contrast, the RetNRef model shows worse performance and delivers much higher latency compared to the G2R-DM model.

Table 2 shows the basic statistics of the original response set R and the response set $R^G$ created by data-level G2R. After applying the data-level G2R, $R^G$ has roughly 11 times more candidates compared to the original response set R. To verify if responses in the new response set $R^G$ show more diversity, the number of unique tokens and bi-gram/tri-grams appearing in each response set may be counted. Referring to Table 2, the augmented response set $R^G$ has much more unique tokens and bi-gram/tri-grams than the

TABLE 1

| Models | Human Evaluation | | | Automated Metrics | | | | Latency (ms) | Latency (Speedup) |
|---|---|---|---|---|---|---|---|---|---|
| | Sum | Appr. | Info. | MaUdE | Dist-2 | Dist-3 | Length | | |
| Blender 90M | 2.843 | 1.429 | 1.414 | 0.8582 | 0.4799 | 0.6887 | 18.31 | 499.7 | 1.00× |
| Blender 2.7B | 2.983 | 1.510 | 1.473 | 0.8826 | 0.5288 | 0.7261 | 19.05 | 1120.8 | 0.45× |
| Blender 9.4B | 2.930 | 1.472 | 1.458 | 0.8763 | 0.5246 | 0.7285 | 18.87 | 1438.6 | 0.35× |
| Distilled Blender | 2.910 | 1.474 | 1.436 | 0.8715 | 0.4821 | 0.6815 | 19.19 | 576.8 | 0.87× |
| RetNRef | 2.771 | 1.404 | 1.368 | 0.8555 | 0.7773 | 0.9541 | 12.34 | 382.4 | 1.31× |
| Bi-encoder | 2.597 | 1.288 | 1.309 | 0.8944 | 0.8191 | 0.9712 | 14.85 | 18.6 | 26.87× |
| Poly-encoder | 2.686 | 1.340 | 1.346 | 0.8645 | 0.8269 | 0.9692 | 15.30 | 24.8 | 20.15× |
| Bi-encoder (w/FAISS) | 2.596 | 1.259 | 1.337 | 0.9046 | 0.8316 | 0.9735 | 15.22 | 25.7 | 19.44× |
| G2R-D (w/o FAISS) | 2.779 | 1.380 | 1.399 | 0.8518 | 0.7242 | 0.9302 | 20.06 | 39.7 | 12.59× |
| G2R-D | 2.759 | 1.398 | 1.361 | 0.8443 | 0.7456 | 0.9395 | 19.93 | 25.3 | 19.75× |
| G2R-DM | 2.856 | 1.447 | 1.410 | 0.8695 | 0.7266 | 0.9393 | 17.48 | 25.1 | 19.91× |
| Human Response | 2.788 | 1.418 | 1.369 | 0.9146 | 0.8271 | 0.9742 | 14.22 | — | — |

Specifically, the blender generative models and the distilled blender model show high human evaluation score while showing relatively large latency along with the lack of diversity, as shown in the Dist-2 and Dist-3 scores. Retrieval baselines (bi-encoder and poly-encoder) show an opposite trend, exhibiting much lower latency and relatively higher response diversity but showing relatively lower conversational ability in terms of human evaluation score. Unlike human evaluation results, the MaUdE scores of the bi-encoder and the poly-encoder are unexpectedly high. However, this may be because the MaUdE metric is trained on the ConvAI2 dataset, which is a subset of the BST+ dataset, and with a similar training objective of these retrieval models. G2R-based models of the present disclosure achieve far better human evaluation results compared to their original model, Bi-encoder (w/FAISS). Applying data-level G2R only (G2R-D) significantly boosts the performance, making the model perform comparable to gold human response in terms of human evaluation. Using data-level G2R enlarges the number of responses in the pre-defined response set $R^G$ more than ten times, therefore using the bi-encoder without FAISS (G2R-D (w/o FAISS)) leads to increased latency. Although using FAISS induces a latency overhead for the case where the size of the response set is small (case of Bi-encoder (w/FAISS)), using FAISS in a larger response set as in G2R-D enables the low latency to be maintained, while having a slight degradation of response qualities compared to the version without FAISS.

Further application of model-level G2R additionally boosts the performance of the retrieval model. G2R-DM trained with the data-level G2R and the model-level G2R shows a higher human evaluation score and MaUdE score than G2R-D trained with the data-level G2R only, and exhibits a comparable human evaluation score to the original response set, implying that it covers more diverse topics, entities and shows more diversity in terms of phrases and expressions.

TABLE 2

| Statistics | R | $R^G$ | Ratio |
|---|---|---|---|
| # of Responses | 279,090 | 3,070,074 | 11.0× |
| Average length | 14.85 | 18.78 | 1.26× |
| # of Unique Tokens | 56,862 | 210,538 | 3.70× |
| # of Unique bi-grams | 655,948 | 2,710,155 | 4.13× |
| # of Unique tri-grams | 1,738.189 | 10,654,181 | 6.13× |

The following description is of an ablation study conducted to analyze in detail how the performance of the model changes depending on how we use responses generated in the data-level G2R method. In data-level G2R, generated responses are utilized for augmenting the training dialogue dataset $D^G$ of the retrieval model R, and for building the augmented response set $R^G$. Through the ablation study, the two utilization methods are separated, and models may be evaluated for a case of using only each method.

Table 3 shows the evaluation results of the ablation models. The human evaluation metrics and automated metrics may be utilized along with Hits@1/K and Hits@5/K of the trained bi-encoder model on the BST+ test set, which are widely adopted to evaluate the performance of retrieval models. In the order from the top to the second-to-last row, Table 3 shows results of the human evaluation and automated metrics according to a case in which the retrieval model is trained using the existing dialogue data set D to build the original response set R (that is, existing dialogue model), a case in which the retrieval model is trained using the existing dialogue data set D to build the augmented response set $R^G$ by the model-level G2R (that is, ablation model), a case in which the retrieval model is trained using the augmented dialogue dataset $D^G$ using the data-level G2R to build the original response set R (that is, ablation model), and a case in which the retrieval model is trained using the augmented dialogue dataset $D^G$ by the data-level G2R to build the augmented response set $R^G$ by the model-level G2R (that is, G2R-DM of the present disclosure).

TABLE 3

| Train $\tilde{R}$ with | Response Set | Human Evaluation | | | Automated Metrics | | | | |
|---|---|---|---|---|---|---|---|---|---|
| | | Sum | Appr. | Info. | Dist-2 | Dist-3 | Length | Hits @ 1/K | Hits @ 5/K |
| D | R | 2.596 | 1.259 | 1.337 | 0.8336 | 0.9777 | 15.66 | 0.7537 | 0.9363 |
| | $R^C$ | 2.620 | 1.300 | 1.320 | 0.7660 | 0.9498 | 17.14 | | |
| $D^C$ | R | 2.739 | 1.377 | 1.361 | 0.8144 | 0.9687 | 16.20 | 0.8052 | 0.9570 |
| | $R^C$ | 2.770 | 1.403 | 1.368 | 0.7456 | 0.9395 | 19.93 | | |
| $D^R$ | R | 2.591 | 1.296 | 1.295 | 0.8253 | 0.9669 | 14.54 | 0.7594 | 0.9323 |

As shown in Table 3, only utilizing one of the methods does not show better performance compared to the model that utilizes both methods. Utilizing the generated responses for building $R^G$ improves the appropriateness score of the model, which supports the dialogue model training method of the present disclosure that using a diverse response set is helpful for the model to respond more appropriately. The use of the augmented dialogue dataset $D^G$ for building R is helpful for increasing a human evaluation score, for both appropriateness and informativeness metrics. In addition, training with augmented dialogue dataset $D^G$ considerably improves the Hits metric of the retrieval model. Nonetheless, using both methods shows the best human evaluation performance among all ablation models, indicating that using new examples for both training a retrieval model and building a response set is important to induce a good performance.

In Table 3, an augmented dialogue dataset generated by training the bi-encoder model using top-m responses of a retrieval model that has already been trained is denoted by $D^R$. When comparing a dialogue model using the augmented dialogue dataset $D^G$ by the data-level G2R to a dialogue model using the augmented dialogue dataset $D^R$, it is verified that the method using a large generative model produces better quality training dataset than simply using a retrieval model. As shown in Table 3, using $D^R$ as the training dataset does not lead to a significant performance gain for all metrics, contrary to the case of using $D^G$ which improves both human evaluation score and Hits metric. This result strongly indicates that utilizing a large-scale generative model for dialogue augmentation as in data-level G2R is a much more effective augmentation strategy than using retrieval models.

According to an example embodiment, although the log-likelihood score (LL score) is used for defining the score $G(c, r)$ of the teacher generative model in model-level G2R, other methods may be applied as well. One example is using a mutual information score (MI score). The MI score is point-wise mutual information between the given context c and the response r. The MI score is known to assign lower values to generic responses while escalating the score of responses that are more specific to the given context. Using the MI score may produce more specific and diverse responses compared to the LL score while having a slightly higher risk of returning responses with inappropriate details with respect to input context. Therefore, the model-level G2R that uses the MI score as $G(c, r)$ is compared in performance to the model that uses an LL score as follows.

Table 4 shows results of human evaluation and automated metrics for model-level G2R models that use the MI score for defining the score $G(c, r)$ of the teacher generative model.

TABLE 4

| | Human Evaluation | | | Automated Metrics | | |
|---|---|---|---|---|---|---|
| $G(c, r)$ | Sum | Appr. | Info. | MaUdE | Dist-2 | Dist-3 |
| LL | 2.856 | 1.447 | 1.410 | 0.8695 | 0.7266 | 0.9393 |
| MI | 2.806 | 1.427 | 1.380 | 0.8737 | 0.7536 | 0.9468 |

Using the MI score for the model-level G2R exhibits a slightly lower human evaluation score than using the LL score, particularly for the appropriateness score, implying that using the MI score may be less capable of producing an appropriate and accurate answer. However, in terms of automated metrics, the MI score shows a higher MaUdE score. In addition, using the MI score shows higher response diversity compared to LL score, indicating that MI score may be employed for more diverse responses of the conversation system.

Table 5 provides an example of responses returned by baseline models and G2R models. In an experiment related to Table 5, it is assumed that a context B ("Oh yeah that is a fact") is input with respect to a phrase ("Amazon is a great place to order books") of a chatbot A as an input context.

TABLE 5

| Model Name | Input Context Response |
|---|---|
| Bi-encoder (w/FAISS) | A: Comics is at the top of the list in interest |
| Blender 90M | A: Do you have any other hobbies that you like to do on the weekends? I like to read |
| Distilled Blender | A: What else do you like to do in your spare time? I like to go to the beach |
| Blender 2.7B | A: What kind of books do you buy on amazon? I like to read science fiction and fantasy |
| Blender 9.4B | A: What kind of books do you like to read? I like romance novels and mystery novels |
| G2R-D | A: Do you ever order grocerys? I love amazon's selection of books and videos |
| G2R-DM | A: What is your favourite book? Mine is "the cat in the hat" by dr seuss |

A: Amazon is a great place to order books
B: Oh yeah that is a fact.

Referring to Table 5, in this example, Bi-encoder(w/FAISS) returns the irrelevant response ("Comics is at the top of the list in interest") to the given context. Responses of the blender models are logically appropriate, however, they just simply change the topic (in the case of Blender 90M and Distilled Blender, "Do you have any other hobbies that you like to do on the weekends? I like to read", "What else do you like to do in your spare time? I like to go to the beach") or relatively lack of specific details (in the case of Blender 2.7B and Blender 9.4B, "What kind of books do you buy on amazon? I like to read science fiction and fantasy", "What kind of books do you like to read? I like romance novels and mystery novels"). The data-level G2R (G2R-D) tries to respond with detail, but the response contains a somewhat irrelevant phrase ("Do you ever order groceries? I love amazon's selection of books and videos") about topics. In contrast, it can be seen that G2R-DM responds appropriately along with specific details ("What is your favorite book? Mine is "the cat in the hat" by Dr. Suess").

Meanwhile, when generating a dialogue model through a retrieval model, the methods described with reference to FIGS. 4 and 5 may be used together.

Figure 6:
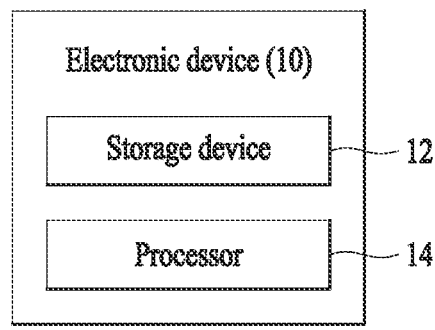
FIG. 6 is a block diagram illustrating an electronic device for training a model-level dialogue model according to an example embodiment.

FIG. 6 is a block diagram illustrating an electronic device 10 for training a model-level dialogue model according to an example embodiment.

According to an example embodiment, the electronic device 10 may include a storage device 12 and a processor 14, and is not to be taken as being limited thereto.

The storage device 12 may store a context and a response required for open-domain conversation. The storage device 12 is hardware for storing various data processed in the electronic device 10, and may store programs for processing and control of the processor 14. The storage device 12 may include a random access memory (RAM) such as a dynamic random access memory (DRAM), a static random access memory (SRAM), or the like, a read-only memory (ROM), an electrically erasable programmable read-only memory (EEPROM), a CD-ROM, a Blu-ray or other optical disk storage, a hard disk drive (HDD), a solid state drive (SSD), or a flash memory.

The processor 14 may control overall operations of the electronic device 10 and process data and a signal. In an example embodiment, the processor 14 may include at least one processor. According to an example embodiment, through the storage device 12, the processor 14 may acquire a response set including a first response subset corresponding to a first context and a second response subset selected arbitrarily, from a first dialogue data set. In addition, the processor 14 may calculate a first score for a response included in the response set with respect to the first context based on a first dialogue model and calculate a second score for a response included in the response set with respect to the first context based on a second dialogue model. Also, the processor 14 may train the second dialogue model based on the first score and the second score.

The electronic device 10 of the present disclosure may further include a communication device (not shown). The communication device may communicate with an external electronic device using wired or wireless communication technology and may include a transceiver. The external electronic device may be a terminal or a server. In addition, the communication technology used by the communication device may include, for example, global system for mobile communication (GSM), code division multi-access (CDMA), long term evolution (LTE), fifth-generation (5G), wireless LAN (WLAN), wireless-fidelity (Wi-Fi), Bluetooth, radio frequency identification (RFID), infrared data association (IrDA), ZigBee, near field communication (NFC), or the like, but not be limited thereto.

The device described in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

According to example embodiments, a retrieval-based dialogue model may return a response corresponding to a response quality of a generative-based dialogue model that generates a fluent response based on rich knowledge of a large-scale language model.

Further, according to example embodiments, it is possible to resolve a high latency issue of a generative-based dialogue model and improve a response quality of a retrieval-based dialogue model.

Effects of the present disclosure are not limited to those described above, and other effects may be made apparent to those skilled in the art from the following description.

What is claimed is:

1. A method of training a dialogue model in an electronic device, the method comprising:
    selecting a first context from a first dialogue data set including at least one pair of a context and a response corresponding to the context;
    generating a first response corresponding to the first context through a first dialogue model, wherein the first dialogue model is a generative-based dialogue model that generates a response to a given context;

generating an augmented dialogue dataset by incorporating a pair of the first context and the first response corresponding to the first context into the first dialogue data set;
generating an augmented response set including a response of the first dialogue data set and the first response; and
training a second dialogue model based on the augmented dialogue dataset, wherein the second dialogue model is a retrieval-based dialogue model that searches for a response to the given context, wherein the training comprises:
  acquiring a response set including a first response subset corresponding to a second context included in the augmented dialogue dataset and a second response subset selected arbitrarily,
  calculating a first score for a response included in the response set with respect to the second context based on the first dialogue model,
  calculating a second score for a response included in the response set with respect to the second context based on the second dialogue model, and
  training the second dialogue model based on the first score and the second score.

2. The method of claim 1, wherein the training of the second dialogue model based on the first score and the second score comprises:
  calculating a loss based on the first score and the second score; and
  training the second dialogue model such that the loss is minimized.

3. A method of training a dialogue model in an electronic device, the method comprising:
  acquiring, from a first dialogue data set, a response set including a first response subset corresponding to a first context and a second response subset selected arbitrarily;
  calculating a first score for a response included in the response set with respect to the first context based on a first dialogue model, wherein the first dialogue model is a generative-based dialogue model that generates a response to a given context;
  calculating a second score for a response included in the response set with respect to the first context based on a second dialogue model, wherein the second dialogue model is a retrieval-based dialogue model that searches for a response to the given context; and
  training the second dialogue model based on the first score and the second score, wherein the training of the second dialogue model includes
  calculating a loss based on the first score and the second score; and
  training the second dialogue model such that the loss is minimized.

4. The method of claim 3, further comprising:
  selecting a second context from a second dialogue data set including at least one pair of a context and a response corresponding to the context;
  generating a response corresponding to the second context through the first dialogue model; and
  generating the first dialogue data set by incorporating a pair of the second context and a response corresponding to the second context into the second dialogue data set.

5. The method of claim 3, wherein the calculating of the second score comprises:
  encoding the first context and a response included in the response set based on fixed-length embedding; and
  calculating a relevance score with respect to the first context for each response included in the response set based on an embedding value corresponding to the first context and an embedding value corresponding to each response included in the response set.

6. The method of claim 3, wherein the first score is calculated using a normalized log-likelihood based on a length of each response included in the response set.

7. The method of claim 3, wherein the first score is calculated based on a mutual information score with respect to the first context for each response included in the response set.

8. The method of claim 3, wherein the loss comprises a cross-entropy loss for a score corresponding to the first response subset and a knowledge distillation loss for a score corresponding to a response included in the response set.

9. The method of claim 8, wherein the training of the second dialogue model such that the loss is minimized comprises training by maximizing a score corresponding to the first response subset so that the cross-entropy loss is minimized.

10. The method of claim 8, wherein the training of the second dialogue model such that the loss is minimized comprises training by matching the first score and the second score so that the knowledge distillation loss is minimized.

11. A non-transitory computer-readable recording medium comprising a computer program to execute the method of claim 3.

12. An electronic device for training a dialogue model, the electronic device comprising:
  a storage device; and
  a controller,
  wherein the controller is configured to
    acquire a response set including a first response subset corresponding to a first context and a second response subset selected arbitrarily, from a first dialogue data set through the storage device;
    calculate a first score for a response included in the response set with respect to the first context based on a first dialogue model, wherein the first dialogue model is a generative-based dialogue model that generates a response to a given context;
    calculate a second score for a response included in the response set with respect to the first context based on a second dialogue model, wherein the second dialogue model is a retrieval-based dialogue model that searches for a response to the given context; and
    train the second dialogue model based on the first score and the second score, wherein, to train the second dialogue model, the controller is configured to
      calculate a loss based on the first score and the second score, and
      train the second dialogue model such that the loss is minimized.

13. The electronic device of claim 12, wherein the controller is configured to:
  select a second context from a second dialogue data set including at least one pair of a context and a response corresponding to the context;
  generate a response corresponding to the second context through the first dialogue model; and generate the first dialogue data set by incorporating a pair of the second context and a response corresponding to the second context into the second dialogue data set.

14. The electronic device of claim 13, wherein the controller is configured to:
    generate an augmented response set including a response of the second dialogue data set and a response corresponding to the second context; and
    store the augmented response set through the storage device.

15. The electronic device of claim 12, wherein the loss comprises a cross-entropy loss for a score corresponding to the first response subset and a knowledge distillation loss for a score corresponding to a response included in the response set.

* * * * *